(12) United States Patent
Battistoni

(10) Patent No.: US 6,247,704 B1
(45) Date of Patent: Jun. 19, 2001

(54) GASKET WITH DYNAMIC EMBOSSMENT

(75) Inventor: Daniel C. Battistoni, West Chicago, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/124,875

(22) Filed: Jul. 30, 1998

(51) Int. Cl.$^7$ .................................................. F02F 11/00
(52) U.S. Cl. ........................ 277/592; 277/593; 277/597; 277/938
(58) Field of Search ................................. 277/592, 593, 277/594, 597, 938

(56) References Cited

U.S. PATENT DOCUMENTS

| | | |
|---|---|---|
| 4,898,396 * | 2/1990 | Udagawa .............................. 277/592 |
| 4,956,226 | 9/1990 | Ashizawa et al. . |
| 5,004,650 | 4/1991 | Ashizawa et al. . |
| 5,275,139 | 1/1994 | Rosenquist . |
| 5,277,434 | 1/1994 | Kestly et al. . |
| 5,362,074 | 11/1994 | Gallo et al. . |
| 5,468,003 | 11/1995 | Staab et al. . |
| 5,490,681 | 2/1996 | Plunkett et al. . |
| 5,551,709 | 9/1996 | Plunkett . |
| 5,893,566 * | 4/1999 | Miyaoh et al. ....................... 277/592 |
| 6,003,877 * | 12/1999 | Martin et al. ......................... 277/592 |

* cited by examiner

Primary Examiner—Anthony Knight
Assistant Examiner—Karlena D. Schwing
(74) Attorney, Agent, or Firm—Rader, Fishman & Grauer PLLC

(57) ABSTRACT

A composite gasket includes a central core located between non-metallic outer facing layers. Each non-metallic outer facing layer has an outer core adjacent the central core. The outer cores can be either perforated or non-perforated. A bead is provided on the central core to produce a resilient biasing force that urges the outer facing layers into contact with respective mating surfaces to improve gasket sealing. The central core optionally has an elastomeric coating to improve sealing between the central core and the outer cores to prevent leakage between gasket layers.

19 Claims, 1 Drawing Sheet

GASKET WITH DYNAMIC EMBOSSMENT

FIELD OF THE INVENTION

The present invention relates to a gasket for an internal combustion engine and, in particular, to a gasket having outer facing layers on either side of a central core member. Each of the outer facing layers is attached to a respective outer core.

BACKGROUND OF THE INVENTION

Gaskets for use in internal combustion engines are known. One known gasket design has multiple layers of steel and are referred to as "MLS" gaskets. In MLS gaskets, at least two sheets of steel are stacked together. Typically, there are three sheets with one middle sheet and two outer sheets. The outer surfaces have an elastomeric coating to accommodate imperfections that might interfere with creating a fluid tight sealing surface. In MLS gaskets, it is known to provide a bead to help establish suitable sealing stress levels and achieve a tight seal. However, one drawback to MLS gaskets is the increased expense of providing a very smooth surface finish to the clamping members. A second drawback is the cost of the elastomeric coating to compensate for imperfections on mating surfaces, such as cylinder heads or blocks.

Another known type of gasket design has outer facing layers made from graphite which are connected to outer cores. The facing layers and outer cores are attached to a central shim. Graphite outer facing layers conform to imperfections in mating surfaces and have a certain degree of resilience or springiness. U.S. Pat. Nos. 5,468,003 and 5,362,074, commonly assigned to Dana Corporation, describe gaskets of this type and each of their disclosures are incorporated herein by reference.

However, outer facing layers with graphite are susceptible to a relaxation phenomenon which results in a decrease in bolt tension and a corresponding reduction in sealing stress. The reduction of sealing stress could lead to an increased possibility of gasket leakage.

SUMMARY OF THE INVENTION

The present invention is directed to a composite gasket for use in an internal combustion engine and includes a central metallic core member with an upper facing layer located above the central core member and a lower facing layer located below the central core member. In addition, an upper core is connected to the upper facing layer and is located between the upper facing layer and the central core member. Similarly, a lower core is connected to the lower facing layer and is located between the lower facing layer and the central core member. A hollow bead is formed in a predetermined location of the central core member to provide a resilient biasing force that improves sealing.

Optionally, but preferably, an elastomeric coating layer is positioned between the central core member and each of the upper and lower cores to seal between gasket layers and prevent combustion gases or fluids from escaping through the gasket.

In a preferred embodiment, the composite gasket has a central core member made from full hard or extra hard stainless steel because of its excellent high temperature spring properties and corrosion resistance. The upper and lower facing layers are preferably made from graphite to improve gasket conformability with respect to mating surface imperfections and minimize tension loss.

Further, the upper and lower cores are preferably perforated and have a plurality of tangs located on one surface thereof for positively retaining the upper and lower facing layers, respectively.

Therefore, the present invention provides upper and lower facing layers that are able to conform to surface anomalies on mating components and eliminate the cost and expense of achieving a controlled surface finish, as required for a MLS type gasket. The present invention further provides a resilient bead that continually biases the upper and lower facing layers into engagement with mating surfaces, offsetting the effects of the relaxation phenomenon associated with non-metallic facing layer materials.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
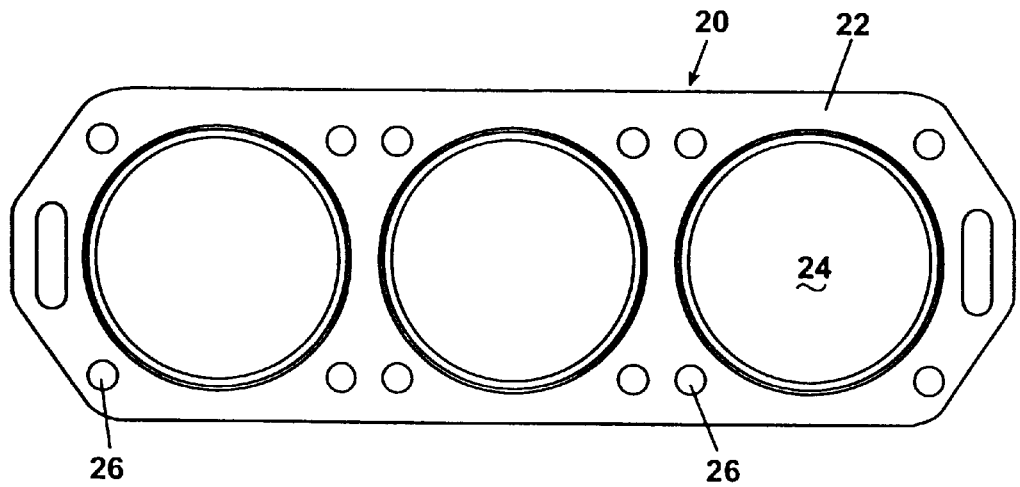
FIG. 1 is a top view of a composite gasket according to the present invention.

FIG. 1 shows a composite gasket 20 for use in an internal combustion engine, for example, a cylinder head gasket. Composite gasket 20 includes a main body 22 having at least one combustion opening 24 for corresponding alignment with an engine cylinder bore (not shown). In addition, at least one fluid opening 26 is provided in main body 22 for alignment with and sealing of fluid flow openings in the engine block and cylinder head (not shown).

Figure 2:
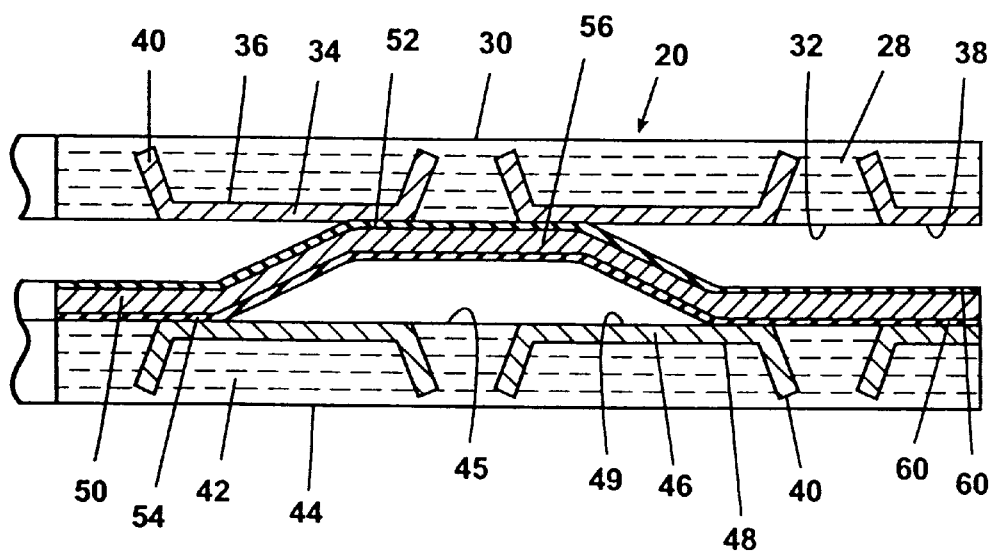
FIG. 2 is a partial cross-sectional view of a composite gasket according to the present invention.

FIG. 2 shows a partial cross-sectional view of composite gasket 20 having an upper facing layer 28 with an outer surface 30 for contacting a first mating surface (not shown). An inner surface 32 of upper facing layer 28 is attached to an upper core 34 along an outer surface 36 thereof. Upper core 34 also includes an inner surface 38 which is designed to abut a central core member 50 and is preferably perforated to form a plurality of upwardly projecting tangs 40 on outer surface 36 for positively retaining upper facing layer 28 against relative movement.

A lower facing layer 42 is spaced away from and located opposite upper facing layer 28. Lower facing layer 42 includes an outer surface 44 for contacting a second mating surface (not shown). An inner surface 45 of lower facing layer 42 is attached to a lower core 46, similar to the way upper facing layer 28 is attached to upper core 34. Lower core 46 is also preferably perforated and includes a plurality of tangs 40 on an outer surface 48 for retaining lower facing layer 42. An inner surface 49 of lower core 46 is designed to abut a central core member 50. Upper and lower facing layers 28, 42 are preferably made from an expanded graphite material which efficiently conducts heat and improves gasket conformability with respect to mating surface imperfections. However, other suitable materials can be used.

A central core member 50 is sandwiched in between upper and lower facing layers 28, 42. Central core member 50 is generally planar having a top surface 52 for abutting inner surface 38 of upper core 34. Bottom surface 54 of central core member 50 is designed to abut inner surface 49 of lower core 46. Central core member 50 also includes a bead 56 illustrated as a hollow, upwardly projecting embossment in central core member 50. Bead 56 is preferably annular and located adjacent to combustion opening 24 for improved sealing of fluids and combustion gases. However, bead 56 can have any geometric shape and be provided at any suitable location. Central core member 50 is preferably metallic and formed from a hard stainless steel or a spring steel to provide a resilient biasing force, via bead 56, that urges upper and lower facing layers 28, 42 outwardly to improve sealing stress and offset the effects of relaxation phenomenon. A stainless steel in the range of three quarters hard to extra hard is contemplated to be used. However, any other suitable material, not necessarily metallic, can be used.

Optionally, but preferably, central core member 50 is coated with a suitable sealing medium 60. For example, sealing medium 60 can be an elastomeric material and is preferably rubber to provide improved sealing and coating. One alternative elastomeric material that is envisioned to be used in the present invention is a thermosetting adhesive.

Alternatively, it is envisioned to provide non-perforated upper and lower cores having their inner surfaces coated by sealing medium 60, instead of coating central core member 50.

Although only one central core member 50 is illustrated, it is also envisioned that two or more opposing central core members 50 could be used to form a generally polygonal bead that has increased biasing force and greater thickness.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A composite gasket for use in an internal combustion engine comprising:
   a central core member;
   an upper facing layer located above said central core member, said upper facing layer formed of graphite;
   a lower facing layer located below said central core member, said lower facing layer formed of graphite;
   an upper core connected to said upper facing layer and located between said upper facing layer and said central core member;
   a lower core connected to said lower facing layer and located between said lower facing layer and said central core member; and
   a bead formed in a predetermined location on said central core member for providing a resilient biasing force that improves sealing.

2. The composite gasket of claim 1, wherein said upper and lower cores are perforated and include a plurality of tangs to positively retain said upper and lower facing layers, respectively.

3. The composite gasket of claim 1, wherein an elastomeric coating layer is positioned between said central core member and each of said upper and lower cores.

4. The composite gasket of claim 3, wherein each of said elastomeric coating layers comprises an elastomeric coating provided on said central core member.

5. The composite gasket of claim 3, wherein each of said elastomeric coating layers is rubber.

6. The composite gasket of claim 3, wherein each of said elastomeric coating layers is a thermosetting adhesive.

7. The composite gasket of claim 1, further comprising a combustion opening and said predetermined location of said bead is adjacent said combustion opening.

8. The composite gasket of claim 1, wherein said central core member is formed from one of a stainless steel and a spring steel.

9. The composite gasket of claim 1, wherein said central core member is formed from a stainless steel material in a range from three quarters hard to extra hard.

10. A composite gasket for use in an internal combustion engine comprising:
    a central metallic core member;
    an upper facing layer formed from graphite and located above said central core member;
    a lower facing layer formed from graphite and located below said central core member;
    a perforated upper core having a plurality of tangs located on one surface thereof for positively connecting to said upper facing layer, said upper core located between said upper facing layer and said central core member;
    a lower core having a plurality of tangs located on one surface thereof for positively connecting to said lower facing layer, said lower core located between said lower facing layer and said central core member; and
    a hollow bead formed at a predetermined location of said central core member for providing a resilient biasing force to urge said upper and lower facing layers outwardly to improve sealing.

11. The composite gasket of claim 6, wherein an elastomeric coating layer is positioned between said central metallic core member and each of said upper and lower cores.

12. The composite gasket of claim 11, wherein each of said elastomeric coating layers is rubber.

13. The composite gasket of claim 10, wherein said upper and lower facing layers are formed from expanded graphite.

14. The composite gasket of claim 6, further comprising a combustion opening and said predetermined location of said bead is adjacent said combustion opening.

15. A composite gasket for use in an internal combustion engine comprising:
    a central stainless steel core member;
    an upper facing layer formed from graphite and located above said central core member;
    a lower facing layer formed from graphite and located below said central core member;
    a perforated upper core having a plurality of tangs located on one surface thereof for positively connecting to said upper facing layer, said upper core located between said upper facing layer and said central core member;
    a lower core having a plurality of tangs located on one surface thereof for positively connecting to said lower facing layer, said lower core located between said lower facing layer and said central core member;
    a hollow bead formed at a predetermined location of said central core member for providing a resilient biasing force to urge said upper and lower facing layers outwardly to improve sealing; and
    an elastomeric coating layer positioned between said central core member and each of said upper and lower cores.

16. The composite gasket of claim 15, wherein each of said elastomeric coating layers comprises an elastomeric coating provided on said central core member.

17. The composite gasket of claim 15, wherein each of said elastomeric coating layers is rubber.

18. The composite gasket of claim 15, wherein each of said elastomeric coating layers is a thermosetting adhesive.

19. The composite gasket of claim 15, further comprising a combustion opening and said predetermined location of said bead is adjacent said combustion opening.

* * * * *

UNITED STATES PATENT AND TRADEMARK OFFICE
CERTIFICATE OF CORRECTION

PATENT NO.   : 6,247,704 B1                                                                 Page 1 of 1
DATED        : June 19, 2001
INVENTOR(S)  : Daniel C. Battistoni It is certified that error appears in the above-identified patent and that said Letters Patent is hereby corrected as shown below:

<u>Column 4,</u>
Lines 23 and 30, replace "6" with -- 10 --.

Signed and Sealed this

Fourteenth Day of May, 2002

Attest:

JAMES E. ROGAN
*Attesting Officer*                    *Director of the United States Patent and Trademark Office*